United States Patent [19]
Waite

[11] Patent Number: 5,845,431
[45] Date of Patent: Dec. 8, 1998

[54] AQUARIUM FISH CATCHER

[76] Inventor: Rosemary Waite, 29142 Manchester, Westland, Mich. 48185

[21] Appl. No.: 821,360

[22] Filed: Mar. 20, 1997

[51] Int. Cl.[6] ................................................ A01K 97/00
[52] U.S. Cl. .............................. 43/54.1; 43/55; 43/100; 43/105; 119/201
[58] Field of Search .................. 43/54.1, 55, 100, 43/105; 119/201

[56] References Cited

U.S. PATENT DOCUMENTS 4,272,906  6/1981  Liebling ........................................ 43/11
5,220,880  6/1993  Alworth et al. ............................ 119/3

Primary Examiner—J. Woodrow Eldred
Attorney, Agent, or Firm—Reising, Ethington, Learman & McCulloch

[57] ABSTRACT

An aquarium fish trap (18) has a container (20) made from molded transparent PETE plastic material. The container is elongated in shape and has a standing closed end (34) and an open end (24). The open end is surrounded by flexible plastic fingers (26) that are normally in an open position but upon actuation of a actuating string (22) can flex to a closed position to trap a fish inside the container (20).

6 Claims, 1 Drawing Sheet

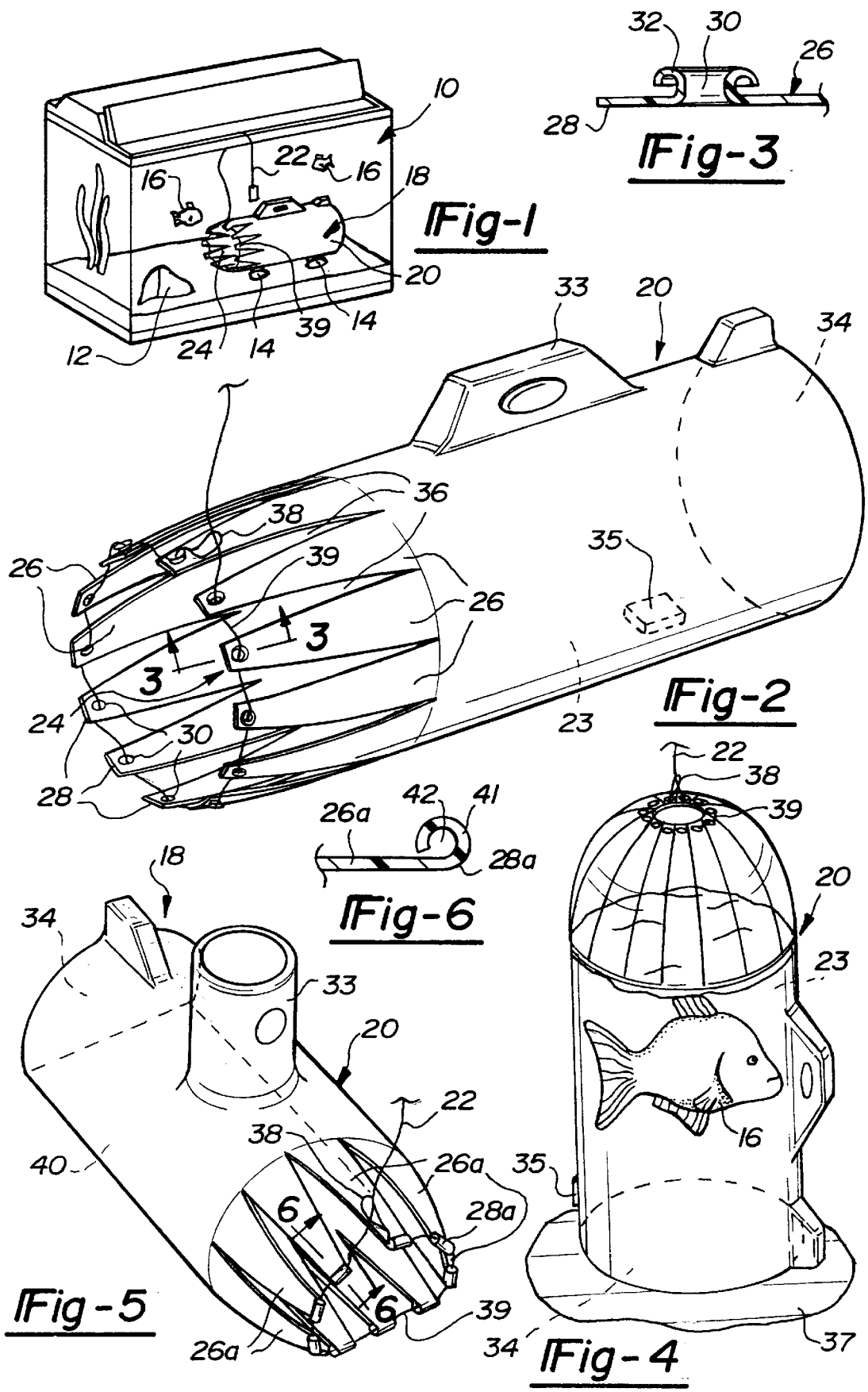

AQUARIUM FISH CATCHER

TECHNICAL FIELD

The field of this invention relates to fish traps and more particularly a fish trap for home aquariums.

BACKGROUND OF THE DISCLOSURE

Aquariums have long been a very popular hobby. As people become more familiar with aquariums, they obtain second and third tanks of greater size, more expensive types of tanks such as seamless acrylic tanks and more variety of fish including tropical salt water varieties. Aquariums often have elaborate displays of sea animals, plants and rocks. Salt water aquariums may include sea anemones, oysters, mussels, sea clams, barnacles, and corals.

Home aquarium hobbyists frequently replenish the fish supply due to age and disease of the fish. They often change variety of fish. There are occasions when a certain recently acquired fish is undesirable and needs to be removed from the tank. It may be eating the other fish or may be the victim of the previous resident fish. There are other reasons for removing a particular fish. It may be ill and require a quarantine.

A small net is commonly used to catch the fish. However, the fish will quickly dart underneath coral or hide in a plant to avoid capture. Often the aquarium caretaker disturbs the rocks, coral, sea anemones, and plant life in order to trap the fish in the net. Such an upheaval of the aquarium environment is not only detrimental to the coral, anemones and plant life that was literally dislocated, but is also detrimental to the fish which prefer stable environments.

What is needed is an expediently made fish catcher or trap that can be placed in a home aquarium on the rocks, corral or sea anemones and closed when the particular fish is inside the fish trap.

SUMMARY OF THE DISCLOSURE

In accordance with one aspect of the invention, an aquarium fish catcher or trap includes a self supporting container made from clear transparent plastic. The plastic has a density only slightly greater than water such that due to a buoyancy factor, it exerts very little weight on the sea animals such as anemones. The container has an opening at one end thereof and an opposite end forming a stand for the container to set upright with the open end positioned at the top. A plurality of flexible plastic fingers extend from the container about the opening to respective distal ends. Each finger is slidably engageable to an actuating string such that the upon actuation of the string, the fingers are flexed radially inward to close the opening and trapping a fish inside. It is also preferable that the fingers are integrally molded with the container.

Preferably the actuating string slidably engages with the fingers to form a loop such that when a free end of the string is pulled upward against the weight of the trap, the loop becomes smaller and the distal ends of the fingers are flexed radially inward to close the opening and trapping a fish inside. The fingers preferably have apertures in proximity to the distal ends thereof for receiving the actuating string therethrough. It is also preferable that each opening has a flared integrally molded contour to eliminate rough edges and promote ease in sliding of the string through the apertures.

It is desirable that the container is elongated in shape to provide a horizontal shaped chamber interior between the end with the opening and the stand end when positioned in the aquarium.

BRIEF DESCRIPTION OF THE DRAWINGS

Reference now is made to the accompanying drawings in which:

FIG. 1 is a front perspective view of an aquarium with a fish catcher in accordance with an embodiment of the invention in position to catch a fish;

FIG. 2 is an enlarged perspective view of the embodiment of the invention shown in FIG. 1;

FIG. 3 is a cross-sectional view of a flexible finger taken along lines 3—3 shown in FIG. 2;

FIG. 4 is a view of the embodiment shown in FIG. 1 after the fish catcher has captured a fish and is standing upright outside of the aquarium;

FIG. 5 is a perspective view of an alternate embodiment of the fish catcher according to the invention; and FIG. 6 is a cross-sectional view taken along lines 6—6 shown in FIG. 5.

DETAILED DESCRIPTION OF THE PREFERRED EMBODIMENT

Referring now to FIG. 1, a salt water aquarium tank 10 is shown with coral 12, sea anemone 14, and a variety of fish 16 therein. A fish catcher 18 is received in the tank 10. The fish catcher 18 includes a self supporting container 20 and an actuating line or string 22.

The container, as more clearly shown in FIG. 2, is a one-piece molded plastic member made from commercially available PETE with an interior chamber 23. The material is thick enough such that even though PETE is a flexible material, the container maintains its shape in or out of the tank 10, in a horizontal position as shown in FIG. 2 or in a vertical position with chamber 23 filled with water as shown in FIG. 4.

The container can be molded in variety of shapes. An elongated tubular shape is preferred although the exact elongated configuration can be infinitely variable. For example, the shape may take the configuration of a submarine, a large mouth fish, or a squid. The chamber 23 has an open end 24 with a plurality of flexible fingers 26 cicumferentially surrounding the open end 24 with formed slits 36 therebetween. The fingers 26 are integrally molded with the one-piece container. The container should be sufficiently sized to trap the fish in question. A is length of 9 inches and a diameter of 4.5 inches is adequate for many smaller fresh and salt water tropical fish.

Each finger 26 may be tapered toward its distal end 28. In addition, each finger has an aperture 30 therethrough near its distal end 28. Each aperture, as illustrated clearly in FIG. 3, may be formed with a rounded eyelet 32 molded into the finger to eliminate rough or sharp corners for the string as described below.

The container has an opposite end 34 that is closed. The end 34 may be flat or otherwise shaped to form a stand as shown in FIG. 3 whereby the container may stand on end 34 on a table 37 or other flat surface. The rest of the container is also non-porous up till the fingers 26 and the formed slits 36 therebetween to hold water within the chamber 23 with any captured fish 16 as illustrated in FIG. 4

The actuating string 22 may be made from nylon fish line. The fish line may have a looped end 38 tied therein and the fish line then passes through each eyelet 32 and aperture 30 and passes through its own looped end 38 to form a variable size loop 39. The rest of the string then extends up out of the tank 10 as shown in FIG. 1.

An embossment 33 extends from the container and can be used as a handle to grab the catcher 20. In operation, the container is submerged in the tank and filled with aquarium water. Food used as bait is placed in the container 20. The food is desirably placed at least half-way toward the closed end 34 away from the open end 24. The container may have an embossment 35 for receiving the food. Once in place, the fish catcher then sits there until the fish that needs to be trapped is within the container either alone or with another fish.

At the desired time, the operator then pulls on the actuating string 22 which commences two actions. One action is that the string is pulled through its own looped end 38 and the loop 39 is tightened. As a result, the fingers 26 flex to a closed position as shown in FIG. 4. Secondly, the end 24 is lifted up and the entire container 20 is reoriented with from the horizontal position shown in FIG. 1 to a more vertical position as shown in FIG. 30. This reorientation of the end 24 disorients the fish and delays it from correctly locating the end 24 until it is too late and the fingers are flexed closed. Further pulling of the string lifts the entire trap out of the tank 10.

The plastic container and the near neutral buoyancy of the plastic provides insignificant weight on any corral or sea anemones such that there is no damage to the aquarium environment. There is no knocking of plants or other major disturbances of the tank set up and little disturbance to the other fish. As shown in FIG. 3, the standing end 34 provides for a convenient standing of the catcher 18 on a table 37 or floor with the captured fish until otherwise transferred to a plastic transfer bag or to another tank.

Another embodiment is shown in FIG. 5. In this embodiment, the container 20 when in the substantially horizontal position as shown, has a flattened bottom side 40 to sit on the flat fish gravel on the bottom of the tank 10. The fingers 26(a) extending from the flattened bottom side also lay flat. This enables bottom feeding fish more opportunity to enter the fish trap.

As shown in FIG. 6, the distal end 28a of each finger 26a is curled to form a loop 41 and tubular aperture 42 extends through the loop. The string 22 extends through each loop aperture 42. The function and operation of this embodiment is the same as the first described embodiment.

Other variations and modifications are possible without departing from the scope and spirit of the present invention as defined by the appended claims.

The embodiments in which an exclusive property or privilege is claimed are defined as follows:

I claim:

1. An aquarium fish catcher characterized by:
   a self-supporting container made from clear transparent plastic;
   said container having an opening at one end thereof and an opposite end forming a stand for the container to set upright with the open end positioned at the top;
   said opening surrounded by flexible plastic fingers that extend from said container about said opening to respective distal ends;
   an actuating string slidably engaged to the fingers to form a loop such that when a free end of the string is pulled upward against the weight of the trap, the loop becomes smaller and the fingers are flexed radially inward to close the opening and trapping a fish inside.

2. A fish catcher as defined in claim 1 further characterized by:
   said container being elongated in shape to provide a horizontal shaped chamber interior between the end with the opening and the stand end when positioned in the aquarium.

3. A fish catcher as defined in claim 1 further characterized by:
   said fingers being integrally molded with the container.

4. A fish catcher as defined in claim 3 further characterized by:
   said fingers having apertures in proximity to the distal ends thereof for receiving the actuating string therethrough.

5. An aquarium fish catcher characterized by:
   a self supporting elongated molded container made from clear transparent plastic;
   said container having an opening at one end thereof and an opposite end forming a stand for the container to set upright with the open end positioned at the top;
   said opening surrounded by flexible plastic fingers that extend from said container about said opening to respective distal ends, said fingers being integrally molded with said container;
   each finger being slidably engageable to an actuating string such that the upon actuation of the string, the fingers are flexed radially inward to close the opening and trapping a fish inside.

6. A fish catcher as defined in claim 5 further characterized by:
   said fingers having apertures in proximity to the distal ends thereof for receiving an actuating string therethrough.

* * * * *